United States Patent [19]

Rancoule et al.

[11] Patent Number: 5,250,479

[45] Date of Patent: Oct. 5, 1993

[54] MAGNESIA-CARBON REFRACTORY COMPOSITIONS FOR SLIDE GATE PLATES AND METHOD OF MANUFACTURE

[75] Inventors: Gilbert Rancoule, Monaca; Duane L. DeBastiani, Pittsburgh, both of Pa.

[73] Assignee: Vesuvius Crucible Company, Pittsburgh, Pa.

[21] Appl. No.: 869,932

[22] Filed: Apr. 16, 1992

[51] Int. Cl.$^5$ .................... C04B 35/04; C04B 35/52
[52] U.S. Cl. .................... 501/101; 501/87; 501/100; 501/109; 501/119; 501/120
[58] Field of Search ............ 501/100, 101, 109, 119, 501/120, 87

[56] References Cited

U.S. PATENT DOCUMENTS

| | | |
|---|---|---|
| 4,306,030 | 12/1981 | Watanabe et al. |
| 4,431,745 | 2/1984 | Watanabe et al. |
| 4,471,059 | 9/1984 | Yoshino et al. |
| 4,521,357 | 6/1985 | Kernion et al. ............... 501/101 X |
| 4,780,434 | 10/1988 | Watanabe et al. |
| 4,912,068 | 3/1990 | Michael et al. |
| 4,957,887 | 9/1990 | Michael et al. |
| 5,007,615 | 4/1991 | Kernion et al. |

*Primary Examiner*—Karl Group
*Attorney, Agent, or Firm*—Webb Burden Ziesenheim & Webb

[57] ABSTRACT

The invention concerns a fired magnesia-carbon shape having a combination of properties making it especially suitable for slide gate plates, inserts for such plates and for pouring nozzles useful in casting aggressive steels. The fired refractory shape is formed from a batch consisting essentially of, by weight percent, 2 to 8 finely divided graphite (natural or synthetic);
3 to 8 aluminum metal powder;
1 to 5 of finely divided silica and/or a silicon yielding powder;
an effective amount of carbon bond forming resins;
and the balance coarse and fine magnesia grains.

The magnesia grains should contain less than about 0.02 weight percent boron oxide. After firing, the shape is characterized by a carbon bonding system including a spinel (magnesia-alumina) phase plus aluminum carbide bonding the magnesia-carbon matrix. The refractory shape is preferably carbon impregnated after firing to further enhance its properties.

20 Claims, 2 Drawing Sheets

MAGNESIA-CARBON REFRACTORY COMPOSITIONS FOR SLIDE GATE PLATES AND METHOD OF MANUFACTURE

FIELD OF THE INVENTION

This invention relates to fired magnesia-carbon refractory shapes that are particularly useful as slide gate plates, inserts and slide gate nozzles for teeming steel and/or to provide any mechanical sliding surface to control steel flow.

BACKGROUND OF THE INVENTION

Unfired or unburned magnesite-carbon refractory furnace brick or plates (hereafter "shapes") are known in the art for lining metallurgical vessels or for slide gate plates and contain, for example, 5 to 30 percent carbon by weight. These shapes are formed with a carbonaceous binder and baked at about 400° F. to cure the binder. Shapes of this type are disclosed, for example, in U.S. Pat. Nos. 5,007,615; 4,306,030 and 4,957,887. U.S. Pat. No. 5,007,615 discloses an unfired magnesite-carbon slide gate plate containing at least 5% by weight carbon and at least 74% by weight magnesite. This patent teaches that it is only possible to have up to 3% carbon in a fired magnesite plate. U.S. Pat. No. 4,306,030 teaches the addition of aluminum powder and/or magnesium powder and silicon powder to an unfired magnesite-carbon brick. U.S. Pat. No. 4,957,887 teaches the use of high-purity magnesite and high-purity graphite in a magnesite-carbon brick containing aluminum metal, magnesium metal or mixtures thereof. This patent teaches that it is undesirable to include silica in the form of impurities in the magnesite or the graphite or as separate additions to the brick.

The magnesite-carbon refractory material described in these references should be distinguished from fired, carbon impregnated refractory shapes. These later products are formed from batches that contain no carbon, are fired in oxidizing atmospheres to form a sintered ceramic oxide bond, and are then impregnated with tar to provide them with a carbon content up to about five percent.

The unfired magnesite-carbon brick have desirable slag resistance properties due to the high carbon content. The principal use of such brick has been in furnace linings.

In modern steel mills, steel is teemed from ladles and tundishes through sliding gate valves at the bottom of these vessels. The sliding gate valves comprise two or three plates having holes therein that can be brought into and out of registry by the relative movement of the plates. The plates of the sliding gate valves must have good erosion resistance as well as excellent mechanical properties at elevated temperatures. The plates and associated nozzles are made of various refractory compositions. Hot modulus of rupture at 2700° F. (1480° C.) is a good measure of the mechanical strength required by plates in slide gates. A strong, cohesive and erosion resistant grain boundary is required to maintain a cohesive refractory structure at these elevated temperatures.

Recent development of aggressive grades of steel has necessitated the creation of different types of ceramic compositions capable of controlling the flow of the molten steel under severe casting conditions. Magnesia products have been developed for high temperature (ladle treatment) or aggressive steels and slag casting conditions. Magnesia could also have potential use for basic or alkaline steel compositions containing calcium and/or manganese. Heretofore it has not been possible to manufacture satisfactory magnesia shapes for slide gate applications having the necessary abrasion resistance and thermal shock resistance due to the failure to provide a suitable bonding structure for magnesia grains.

Up to this time, it has not been possible to create an acceptable bonding structure for magnesia grains. Prior carbon bonded magnesia ceramic compositions have proven to be a weak material, possessing low physical properties, so the inherent chemical advantage of the magnesia has heretofore not been fully realized.

SUMMARY OF THE INVENTION

It is an advantage according to this invention to provide a fired magnesia-carbon refractory shape with a carbon bonding system including a magnesia-alumina spinel and aluminum carbides which precipitate to the bonding phase forming in situ during the high temperature firing treatment.

It is a further object according to this invention to provide a fired magnesia-graphite refractory shape having a unique combination of hot strength at the application temperature (1500° C. range), resistance to thermal shock, abrasion, oxidation and hydration.

It is a yet further object of this invention to provide a magnesia-graphite, carbon bonded shape having a combination of properties making it especially suitable for slide gate plates, inserts for such plates and for pouring nozzles.

Briefly, according to this invention, there is provided a fired refractory shape formed from a batch consisting essentially of, by weight percent, 2 to 8 finely divided graphite (natural or synthetic);

3 to 8 aluminum metal powder;

1 to 5 of finely divided silica and/or silicon metal powder and a silicon yielding powder and mixtures thereof;

an effective amount (4%-7.5%) of carbon bond forming resins;

and the balance coarse and fine magnesia grains plus incidental impurities such as boron, calcia and silica.

The coarse and fine magnesia grains should be at least 95 weight percent MgO and preferably 98 weight percent MgO having less than about 0.02 weight percent boron oxide and having a calcia to silica ratio greater than 2. The refractory shape must be fired in a reducing atmosphere or nonoxidizing atmosphere at a temperature of at least 1832° F. (1000° C.). After firing, the shape is characterized by a carbon bonding system including a spinel (magnesia-alumina) phase plus aluminum carbide in the magnesia-graphite matrix. Most preferably, the refractory shape is tar or resin impregnated after firing. The total after fired carbon content is about 6 to 12 weight percent, including the graphite, coked phenolic binders and impregnating carbon sources. The impregnated refractory shape is further characterized by having a final apparent porosity of less than 6% and preferably about 3%.

DESCRIPTION OF THE PREFERRED EMBODIMENTS ISOSTATIC PRESSING PROCESS

Figure 1:
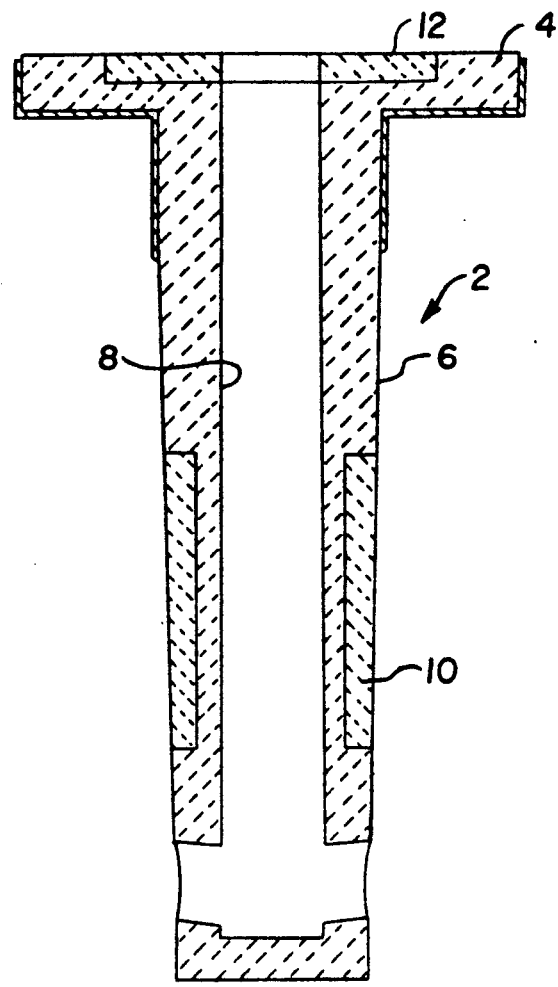
FIG. 1 is a cross-sectional side elevation view of a lower plate and integral pouring nozzle for use on a tundish sliding gate valve having an insert plate made according to the present invention.

Referring to the drawings, FIG. 1 depicts an integral lower plate and pouring tube, generally designated by reference numeral 2, for use as a lower plate in a sliding gate valve (not shown) for controlling molten steel flow from a tundish. The isostatically pressed member 2 comprises a plate portion 4 with an integral, copressed tube portion 6 having an axial bore 8 passing therethrough for teeming steel. The tube portion 6 may also have a copressed slagline sleeve 10 of an erosion resistant material therearound. Typically, the plate portion 4 and tube 6 may be formed of an alumina-graphite refractory composition. The conventional slagline sleeve 10 may be formed of a zirconia graphite composition. An insert or full sliding surface 12 formed of a magnesia-graphite composition according to the present invention is provided along an upper surface of the plate portion 4 surrounding the bore 8. The composition of insert 12 will be explained in greater detail hereinafter. The insert 12 may be isostatically copressed and fired with the member 2 or it may be pressed and fired separately and cemented into place. Firing is conducted in a reducing atmosphere to protect the carbon from oxidizing at temperatures of about 1000° C. (1832° F.) to about 1400° C. (2552° F.) to develop the carbon bond system and to create an open porosity of about 13% prior to impregnation by a carbonaceous material. This level of porosity resulting from firing, permits additional amounts of carbonaceous material to be impregnated than would be the case at a lower porosity.

Pressed and fired refractory shapes made according to the present invention are preferably impregnated with a liquid carbonaceous material such as tar (pitch) or resin. The carbonaceous material fills the pores of the fired refractory shape and protects the aluminum carbide and magnesia constituents from hydration. The carbon impregnation also reduces the apparent porosity to as low as about 3% which serves to further protect the refractory oxide from corrosive attack by the molten steel which otherwise occurs if the steel is permitted to infiltrate the pores of the refractory. Generally, flat shapes, such as hydraulically pressed slide gate plates and plate inserts are tar impregnated, while more complicated isopressed and fired shapes are resin impregnated. Pieces to be impregnated are placed into a vessel and evacuated to approximately 0.99 bars. The vacuum is maintained at this level between 15 minutes and 1 hour. This ensures that entrapped air within the internal pores of the piece is removed. At this point, liquid resin is introduced into the vessel. The required viscosity of the impregnant is dependant on the pore size of the piece. A piece with finely distributed porosity requires low viscosity impregnant to ensure adequate impregnation. The viscosity range is typically between 10–100 centipoise. Higher viscosity resins can be used if thinned with appropriate solvents. Once the impregnant has been introduced to the vessel, a pressure between 1.5 and 7 bars is typically applied to force the resin into the porosity. This completes the impregnation process. An impregnated piece is then cured to 200°–250° C. to drive off low temperature volatiles. The cured resin can be carbonized to give fixed carbon by heating to 950° C. in a reducing atmosphere.

HYDRAULIC PRESSING PROCESS

Figure 2:
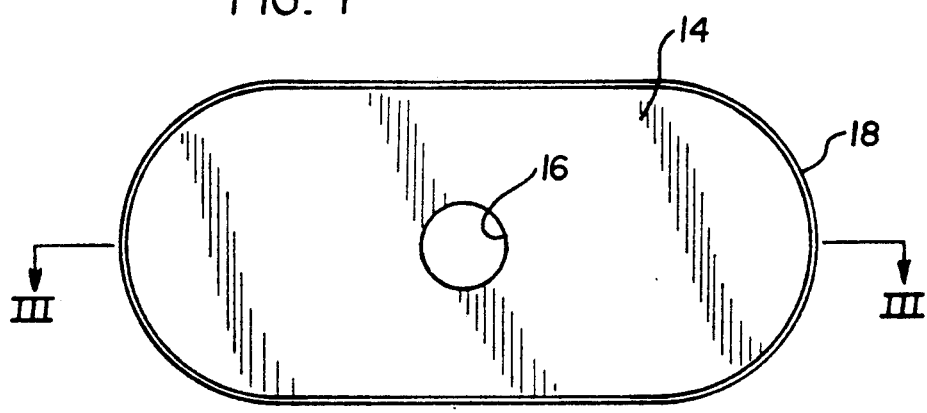
FIG. 2 is a plan view of a slide gate plate made according to the present invention.
Figure 3:
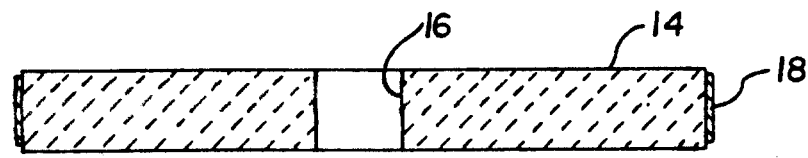
FIG. 3 is a cross-sectional side view of the plate of FIG. 2 taken along line III—III.

FIGS. 2 and 3 show a flat slide gate plate 14 useful as a component in a sliding gate valve. The plate 14 is formed by hydraulically pressing a powder mixture comprising the magnesia-graphite composition of the present invention which is subsequently fired. The slide gate plate 14 has a bore 16 formed therein to permit the passage of molten steel therethrough. The plate 14 also may have a steel band 18 positioned around its periphery as is customary in plates of this type.

Figure 4:
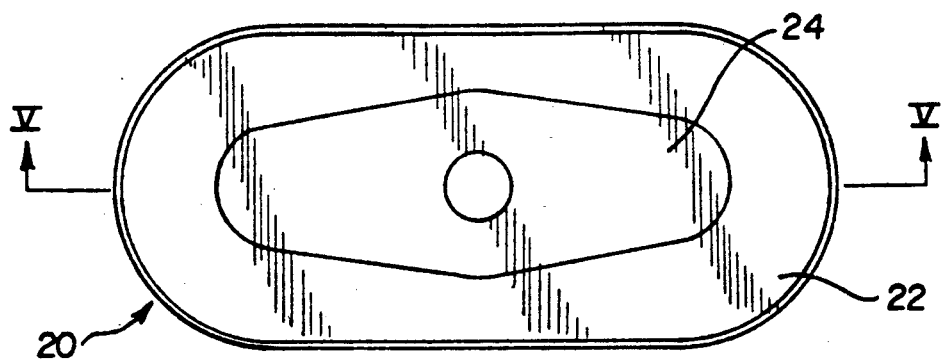
FIG. 4 is a top plan view of a lower slide gate plate suitable for use on a ladle and having an insert made according to the present invention.
Figure 5:
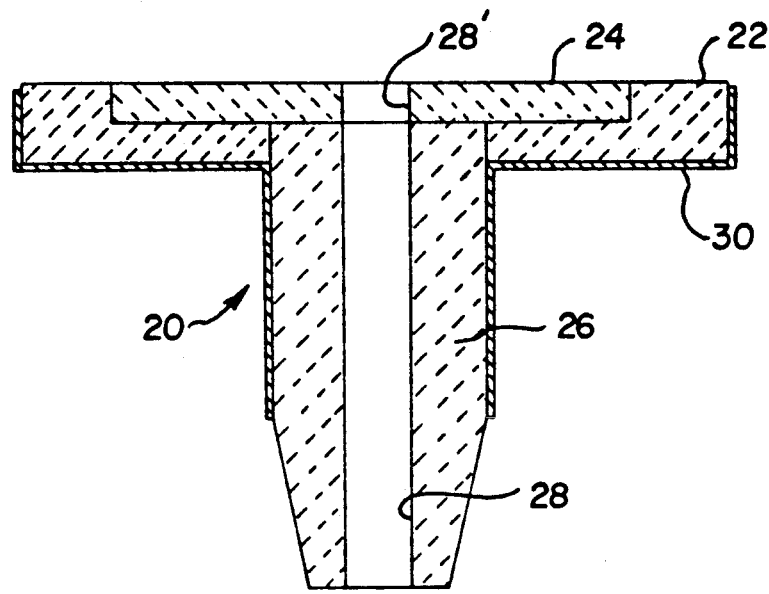
FIG. 5 is a cross-sectional side view of the lower plate and a collector nozzle taken along line V—V of FIG. 4.

FIGS. 4 and 5 depict an assembled lower plate and nozzle member 20 for use on a ladle type sliding gate valve. The member 20 includes a plate portion 22 with an insert 24 of a magnesia-graphite composition of the invention hydraulically copressed or cemented therein. The nozzle portion 26 has a bore 28 axially aligned with bore 28' formed in the insert 24 for the passage of steel therethrough. A steel can 30 surrounds the plate and nozzle portions in a conventional manner. The plate member 22 may be formed of a castable refractory composition while the tube portion 26 is formed of a pressed and unfired refractory (carbon bonded or oxide bonded) or of a pressed and fired refractory metal-oxide graphite refractory material such as a conventional alumina-graphite.

Figure 6:
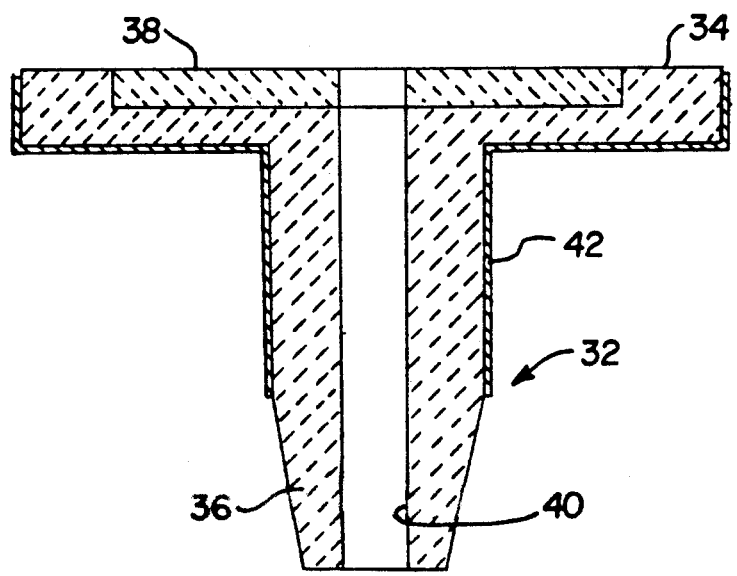
FIG. 6 is a cross-sectional side view of a lower plate and collector nozzle similar to FIG. 5 wherein the plate, insert and nozzle are co-pressed.

The integral lower plate and nozzle member 32 shown in FIG. 6 is similar to member 20 and is also suitable for use in a ladle sliding gate valve. Member 32 consists of copressed plate and nozzle portions, 34 and 36, respectively. An insert 38 of a magnesia-graphite material according to the invention is copressed and fired with the plate and nozzle portions. An axial bore 40 extends through the insert 38 and nozzle portion 36 for the teeming of steel therethrough. A steel can 42 encases the member 32 in a known manner. The member 32 is preferably impregnated with tar after firing in a manner well-known in the art. Hydraulic pressed pieces are tar impregnated after firing. Isostatically pressed and fired pieces of a complex shape are usually resin impregnated. Thus, previously described member 2 is resin impregnated, while flat plate shapes 14 and 20 are preferably tar impregnated after firing.

EXAMPLE 1

A size-graded batch was prepared from the following ingredients by weight percent:

| | |
|---|---|
| Flake Graphite (minus 200 mesh): | 7 |
| Aluminum metal powder (minus 325 mesh): | 5 |
| Silicon metal powder (minus 325 mesh): | 2 |
| Silica powder (fumed): | 1.5 |
| Magnesia grains (coarse and fine): | balance |

The batch was then mixed with the following carbonaceous binder system by weight percent of the batch:

| | |
|---|---|
| Phenol resin (4.5) and solvent (2.0) | 6.5 |

The batch with binder was formed into a pressed shape by pressing in excess of 5000 psi. The shapes were plates suitable for use as slide gates. The pressed plates were then fired at least above 1000° C. in a reducing atmosphere to produce a carbon bonded refractory structure. The fired shapes were then conventionally tar impregnated by preheating, vacuum, immersion and pressurization.

The properties of the fired shapes were determined to be as set forth in the following table.

TABLE 1

| | Without Tar Impregnation | Tar Impregnated |
|---|---|---|
| Room Temperature | | |
| Modulus of Rupture (psi): | 2100 | 2600 |
| MPa | 14.5 | 17.9 |
| Hot (2700° F. or 1480° C.) | | |
| Modulus of Rupture (psi): | 2300 | 3000 |
| MPa | 15.8 | 20.6 |
| Thermal shock/abrasion resistance: | Good | Good |
| Oxidation resistance: | Good | Good |
| Hydration resistance: | Good | Good |

The room temperature and cold modulus of rupture were determined by standard methods known in the art. The test and evaluation procedures for the thermal shock resistance, oxidation resistance and hydration resistance are described below.

Thermal shock resistance test procedure: The procedure is based on a flame test evaluation. An oxygen-propane flame is moved over the surface of a test specimen to simulate the thermal shock produced by steel flowing thereby during the opening and closing of a slide gate. The distance of the flame from the specimen and the hardness of the flame are controlled. All samples are compared with reference to cracking patterns, spalling, change in appearance and presence of melted phases. The evaluation is assigned according to the following criteria.

| | Criteria | |
|---|---|---|
| Evaluation | Thermal | Hydration |
| | physical damage | weight change |
| Good | no damage | >10 cycles |
| Fair | limited cracks | 4-10 cycles |
| Poor | extensive cracks | 2-3 cycles |

| | -continued | |
|---|---|---|
| | Criteria | |
| Evaluation | Thermal | Hydration |
| Bad | spalling | 1 cycle |

Oxidation resistance test procedure: The oxidation test procedure is done on cubic specimens representative of the composition. These are exposed to air for periods of between 1 and 3 hours (less if the specimen crumbles) at 1000° C. The measure of weight loss and oxidation penetration permit one to compare specimens and determine the oxidation behavior. The evaluation is assigned according to the following criteria. (Ranking evaluation is used for comparison purposes.)

Hydration resistance test procedure: This is a severe test conducted with all potential sources of hydration possible (liquid vapor). A cycling evaluation is made by impregnating the specimen (vacuum, followed by pressure impregnation with water) to obtain an intimate contact between the water and the total porosity of the specimen. Next, the specimen is force dried which permits high vapor pressure but also higher potential of reactivity with unstable phases of the specimen. Weight gain and loss is measured. The evaluation is assigned according to the criteria set forth hereinabove.

COMPARATIVE EXAMPLES

By way of comparison, shapes were made from the batches set forth below and tested with the results reported as follows:

Size-graded batches were prepared from the following ingredients by weight percent:

| Comparative Example | A | B | C | D | E | F | G |
|---|---|---|---|---|---|---|---|
| Flake Graphite (minus 200 mesh): | 5 | 5 | 5 | 5 | 7 | 7 | 7 |
| Aluminum metal powder (minus 325 mesh): | 0 | 0 | 0 | 4 | 5 | 5 | 5 |
| Silicon metal powder (minus 325 mesh): | 0 | 2 | 4 | 0 | 2 | 0 | 2 |
| Silica (fumed): | 0 | 0 | 0 | 0 | 0 | 1.5 | 1.5 |
| Magnesia grains (coarse and fine): | | | | balance | | | |

The batches were then mixed with the following binder by weight percent of the batches:

| | |
|---|---|
| Phenol resins: | 6.5 |

The shapes were pressed and fired in a reducing atmosphere as described above. The test pieces were not tar impregnated.

The properties of these comparative shapes are set forth in the following table.

TABLE 2

| Comparative Example | A | B | C | D | E | F | G |
|---|---|---|---|---|---|---|---|
| Room Temperature | | | | | | | |
| Modulus of Rupture (psi): | 380 | 600 | 950 | 1500 | 2000 | 2100 | 2100 |
| MPa | 2.6 | 4.1 | 6.5 | 10.3 | 13.8 | 14.5 | 14.5 |
| Hot (2700° F. or 1480° C.) | | | | | | | |
| Modulus of Rupture (psi): | NA | NA | 920 | 1600 | 1800 | 2260 | 2300 |
| MPa | — | — | 6.3 | 11.0 | 12.4 | 15.5 | 15.8 |
| Thermal shock/ | | | | | | | |
| abrasion resistance: | Poor | Poor | Good | Fair | Good | Good | Good |
| Oxidation resistance: | Bad | Poor | Poor | Poor | Good | Good | Good |

TABLE 2-continued

| Comparative Example | A | B | C | D | E | F | G |
|---|---|---|---|---|---|---|---|
| Hydration resistance: | Good | Good | Good | Bad | Fair | Fair | Good |

From a comparison of the properties for the shape made according to the teaching of this invention with the comparative examples, it is noted that aluminum metal plus silicon metal and/or fine silica are requisite ingredients of the batch in order to obtain the properties needed for a slide gate plate.

EXAMPLES 2 AND 3

Additional examples according to this invention were prepared from magnesia grains of mixes A and B having the following compositions:

| Magnesia Mix | A | B |
|---|---|---|
| Chemical Composition by weight percent: | | |
| $B_2O_3$ | 0.08 | 0.02 |
| CaO | 0.8 | 0.7 |
| $SiO_2$ | 0.6 | 0.1 |
| $Fe_2O_3$ | 0.25 | 0.50 |
| MgO | balance | balance |

| EXAMPLE | #2 | #3 |
|---|---|---|
| Flake Graphite (minus 200 mesh): | 7 | 7 |
| Aluminum metal powder (minus 325 mesh): | 5 | 5 |
| Silicon metal powder (minus 325 mesh): | 2 | 2 |
| Silica (fumed): | 1.5 | 1.5 |
| Magnesia Mix A grains (coarse and fine): | balance | |
| Magnesia Mix B grains (coarse and fine): | | balance |

The batch was then mixed with the following carbonaceous binder system by weight percent of the batch:

| Novolac resin and solvent: | 6.5 |
|---|---|

The batches were pressed into shapes and fired in reducing atmospheres at 1832° F. (1000° C.) and 2552° F. (1400° C.). The shapes were tested and the fired properties, before impregnation, are reported in the following table:

TABLE 3

| EXAMPLE | 2 | 2 | 3 | 3 |
|---|---|---|---|---|
| Firing Temperature (°C.): | 1400° | 1000° | 1400° | 1000° |
| Room Temperature | | | | |
| Modulus of Rupture (psi): | 2180 | 3000 | 2100 | 3100 |
| MPa | 15.0 | 20.7 | 14.5 | 21.3 |
| Hot (2700° F. or 1480° C.) | | | | |
| Modulus of Rupture (psi): | 2000 | 1750 | 2400 | 2900 |
| MPa | 13.7 | 12.0 | 16.5 | 20.0 |

The data in TABLE 3 establish the decided advantage of the high-purity magnesia of Example #3 and Mix B. Thus, it is preferred to limit the boron oxide content of the mix to no more than 0.02 weight percent and also to maintain the calcia:silica ratio to greater than 2.

While the above-described invention refers to magnesia grains, it should be understood that a portion of the magnesia can be replaced with compatible basic refractory grains including, for example, dead burned dolomite grains or spinel.

It is important to understand the manufacturing process employed in the present invention and how that process develops the improved properties possessed by the refractory shapes produced thereby. The high temperature firing step employed after pressing, but prior to tar or resin impregnation, results in the formation of the desired carbon bond system. The small metallic additions such as aluminum and silicon are made in order to create strength inside the carbon bond material. The metallic additions react with the carbon at the high firing temperatures (greater than 1000° C.) to form carbides. Aluminum carbide ($Al_4C_3$) is a type of carbide which provides increased thermal strength to thus improve the hot physical properties of the article.

Even though aluminum carbide has good thermal strength, it also is known to be metastable and will readily react with free water or humidity to form a more stable oxide phase of alumina ($Al_2O_3$). In the present invention, the unstable aluminum carbide phase is protected against hydration by the carbonaceous impregnate. The high temperature firing process, in addition to developing the carbon bond system and forming the metal carbides, also develops a considerable porosity in the pressed and fired article prior to carbonaceous impregnation, on the order of about 13%. By way of comparison, a pressed and cured (unfired) shape made according to aforementioned U.S. Pat. No. 5,007,615 has a porosity of about 7% prior to impregnation. Surprisingly, the higher porosity fired refractory material of the present invention achieves a lower porosity after carbonaceous impregnation than the aforementioned cured (unfired) shape after carbonaceous impregnation. The higher porosity (13%) of the as-fired shape permits almost double the amount of carbonaceous impregnation than the cured (unfired) shape of the referenced prior art. This feature provides a finished apparent porosity after impregnation of between 3%–6% for the shapes of the invention compared with 12%–13% for the cured (unfired) impregnated and baked shapes of U.S. Pat. No. 5,007,615. Thus, the invention provides a reduction in apparent porosity in the finished shape of 50% to 75% less than that achieved in the referenced patent.

The very low apparent porosity achieved in the present invention after impregnation protects the aluminum carbide phase from hydration as a result of the increased impregnated carbon contained inside the refractory structure. The total carbon content of the refractory material of the invention in the preferred embodiments is about double that of the referenced prior art. This is due in part to the fact that the firing is conducted in a reducing or non-oxidizing atmosphere which permits the use of substantially greater amounts of carbon on the order of 10% or greater, substantially more than the 3% carbon limit set forth in U.S. Pat. No. 5,007,615 for fired plates and about 5% for the cured, unfired plates. As stated above, the higher level of open porosity achieved after firing also permits the impregnation of higher amounts of carbonaceous material into the product of the present invention than is possible in the unfired carbon bonded materials of the prior art.

The higher carbon content and lower apparent porosity of the carbon bonded magnesia graphite refractory shapes of the present invention represent a significant improvement in slide gate applications. The lower porosity prevents molten steel infiltration in the plates while the higher carbon content increases thermal conductivity which decreases thermal shock problems. The higher carbon also reduces sticking problems common in slide gate plates by providing lubrication therebetween. This permits longer casting times and a higher number of heats with less molten steel sticking problems than heretofore possible.

While specific embodiments of the invention have been described in detail, it will be appreciated by those skilled in the art that various modifications and alternatives to those details could be developed in light of the overall teachings of the disclosure. The presently preferred embodiments described herein are means to be illustrative only and not limiting as to the scope of the invention which is to be given the full breadth of the appended claims and any and all equivalents thereof.

We claim:

1. A fired, carbon impregnated refractory shape formed from a batch consisting essentially of by weight percent:
   2 to 8 graphite;
   3 to 8 aluminum metal powder;
   1 to 5 of at least one of a silicon yielding powder and a finely divided silica;
   an effective amount of carbon resin necessary to form a carbon bond during firing;
   the balance coarse and fine magnesia grains plus incidental impurities; and
   wherein said fired and carbon impregnated shape has a total carbon content of between about 6 to 12 weight percent and has an apparent porosity of between about 3%–6%.

2. A refractory shape according to claim 1 which has been fired in a non-oxidizing atmosphere at a temperature of at least 1000° C.

3. A refractory shape according to claim 1 that contains less than about 0.02 weight percent boron oxide.

4. A refractory shape according to claim 3 wherein the magnesia has a calcia to silica ratio of greater than 2.

5. A refractory shape according to claim 1 wherein the finely divided silica powder is fumed silica.

6. A refractory shape according to claim 1 wherein the microstructure is characterized by a carbon bond system having a magnesia-alumina spinel phase and aluminum carbide therein.

7. The refractory shape according to claim 1 wherein the carbon resin is a phenolic resin.

8. The refractory shape according to claim 1 wherein the silicon yielding powder is silicon metal powder.

9. A fired, carbon impregnated refractory shape for use in a sliding gate valve for teeming molten metal, said shape formed from a batch consisting essentially of by weight percent:
   2 to 8 graphite;
   3 to 8 aluminum metal powder;
   1 to 5 of at least one of a silicon yielding powder and a finely divided silica;
   4 to 7.5 of carbon bond forming agents;
   the balance coarse and fine magnesia grains plus incidental impurities; and
   wherein said fired and carbon impregnated shape has a total carbon content of between about 6 to 12 weight percent and has an apparent porosity of between about 3%–6%.

10. A refractory shape according to claim 9 that has been carbon impregnated after firing with a carbonaceous material selected from the group consisting of tar and resin.

11. A refractory shape according to claim 10 comprising a slide gate plate.

12. A refractory shape according to claim 10 comprising an integral slide gate plate and nozzle.

13. A refractory shape according to claim 10 comprising an insert for a slide gate plate.

14. A refractory shape according to claim 9 that contains less than about 0.02 weight percent boron oxide.

15. A refractory shape according to claim 14 wherein the magnesia has a calcia to silica ratio of greater than about 2 and said magnesia contains less than 0.02 weight percent boron oxide.

16. A process for manufacturing a refractory shape for use in a slide gate valve comprising:
   providing a batch consisting essentially of by weight percent:
   2 to 8 graphite;
   3 to 8 aluminum metal powder;
   1 to 5 of at least one of a silicon yielding powder and a finely divided silica;
   an effective amount of carbon resins necessary to form a carbon bond during a subsequent firing step; and
   the balance magnesia;
   pressing the batch to form a shape;
   firing the pressed shape in a non-oxidizing atmosphere at a temperature in excess of about 1000° C. (1832° F.); and
   impregnating the fired shape with a carbonaceous material to provide a fired and carbon impregnated shape having a total carbon content of between about 6 to 12 weight percent and having an apparent porosity of between about 3%–6%.

17. The process of claim 16 where the pressing step is carried out by an isostatic pressing process and the impregnated carbonaceous material is a resin material.

18. The process of claim 17 wherein the resin impregnated shape is heated to 200° C.–250° C. to cure the impregnated resin and then heated to about 950° C. in a reducing atmosphere to carbonize the impregnated resin.

19. The process of claim 16 where the pressing step is carried out by a hydraulic pressing process and wherein the impregnated carbonaceous material is tar.

20. The process of claim 19 wherein the shape is a flat plate, suitable for use as a slide gate plate.

* * * * *